J. B. WARREN.
EGG TESTER.
APPLICATION FILED MAY 26, 1916. RENEWED JAN. 8, 1917.

1,216,634.

Patented Feb. 20, 1917.
3 SHEETS—SHEET 1.

Inventor:
John B. Warren,
by Walter E. Lombard,
Atty.

J. B. WARREN.
EGG TESTER.
APPLICATION FILED MAY 26, 1916. RENEWED JAN. 8, 1917.
1,216,634.
Patented Feb. 20, 1917.
3 SHEETS—SHEET 2.
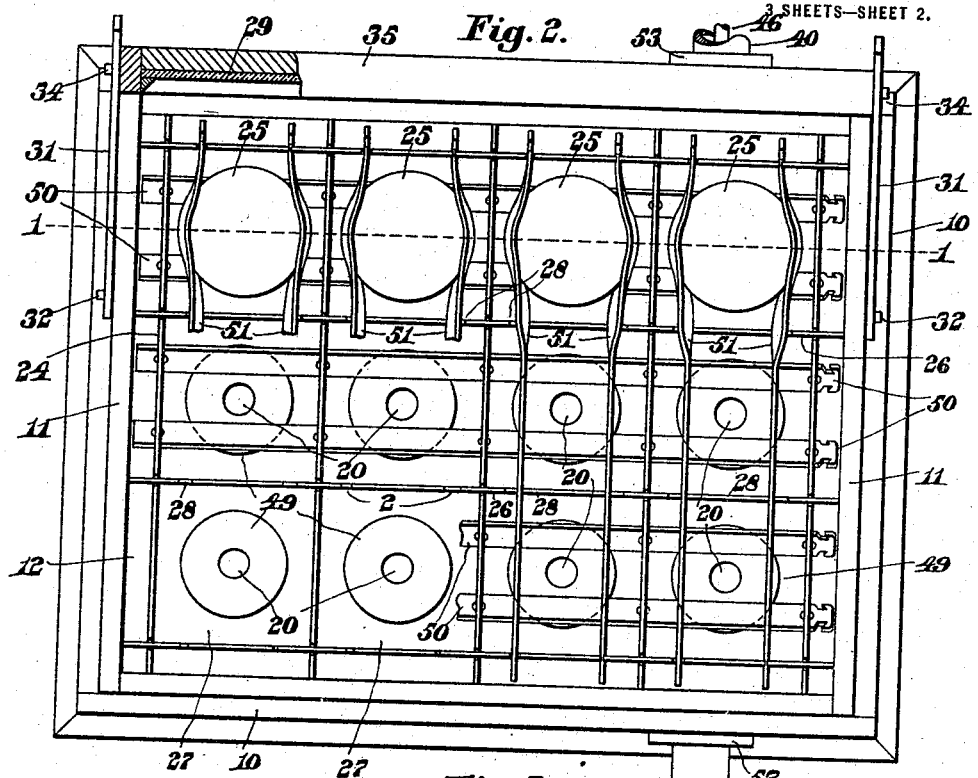
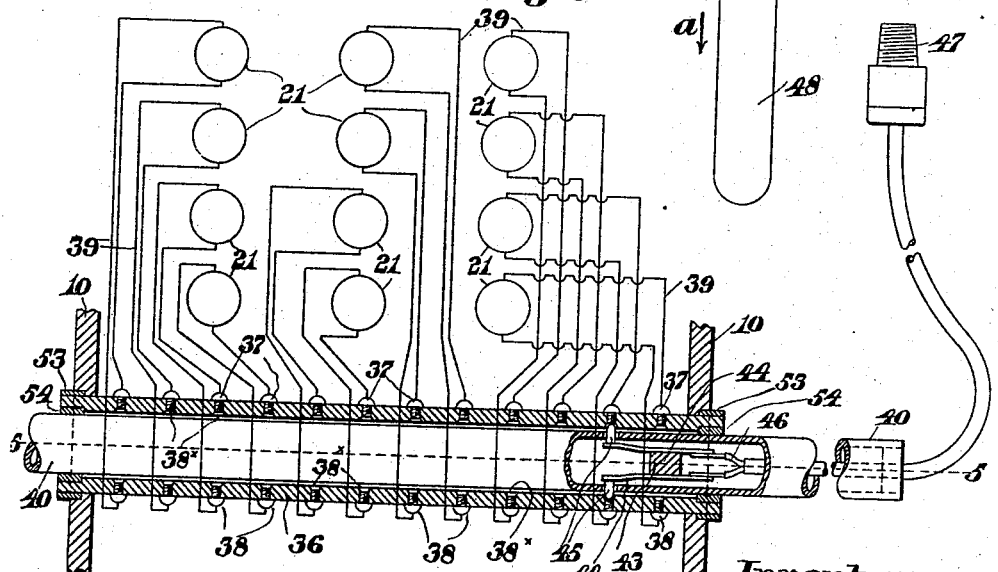
Inventor:
John B. Warren,
by Walter E. Lombard.
Atty.

J. B. WARREN.
EGG TESTER.
APPLICATION FILED MAY 26, 1916. RENEWED JAN. 8, 1917.
1,216,634.
Patented Feb. 20, 1917.
3 SHEETS—SHEET 3.
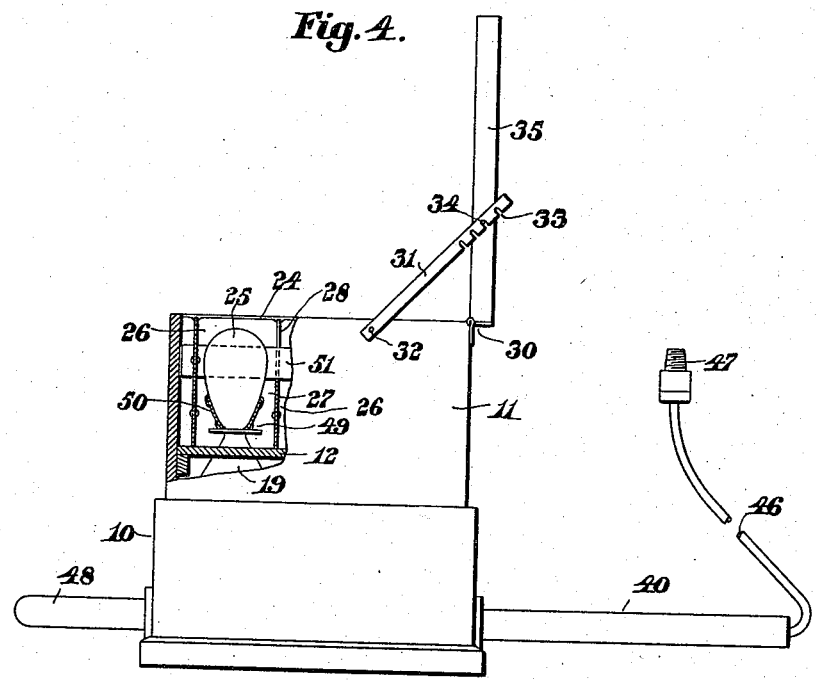
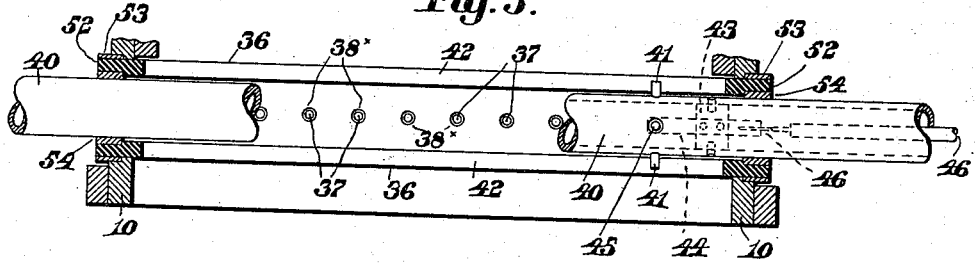
Inventor:
John B. Warren,
by Walter E. Lombard,
Atty.

UNITED STATES PATENT OFFICE.

JOHN B. WARREN, OF BOLTON, MASSACHUSETTS, ASSIGNOR TO BROADFIELD POULTRY FARM, INC., OF BOLTON, MASSACHUSETTS, A CORPORATION OF MASSACHUSETTS.

EGG-TESTER.

1,216,634.      Specification of Letters Patent.      Patented Feb. 20, 1917.

Application filed May 26, 1916, Serial No. 100,710. Renewed January 8, 1917. Serial No. 141,341.

*To all whom it may concern:*

Be it known that I, JOHN B. WARREN, a citizen of the United States of America, and a resident of Bolton, in the county of Worcester and State of Massachusetts, have invented certain new and useful Improvements in Egg-Testers, of which the following is a specification.

This invention relates to devices for testing eggs and particularly to that class of such devices in which a light is used to illuminate the interior of the egg and thereby disclose its condition.

The object of the invention is to provide means for quickly and effectively testing a plurality of eggs without handling them or removing the eggs from the tray.

The invention consists primarily of a receptacle adapted to receive an egg tray having eggs in the various pockets thereof, said eggs being positioned above devices adapted to successively project rays of light through said eggs and illuminate the interior thereof.

The invention further consists in certain novel features of construction and arrangement of parts which will be fully understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings:

Fig. 2 represents a plan of the same with portions thereof broken away.

Fig. 3 represents a diagram of the lighting system and showing the switch mechanism in section.

Fig. 4 represents an end elevation of the apparatus on a reduced scale with a portion thereof shown in section, and Fig. 5 represents a section of the switch mechanism on line 5—5 on Fig. 3.

Similar characters designate like parts throughout the several figures of the drawings.

Figure 1:
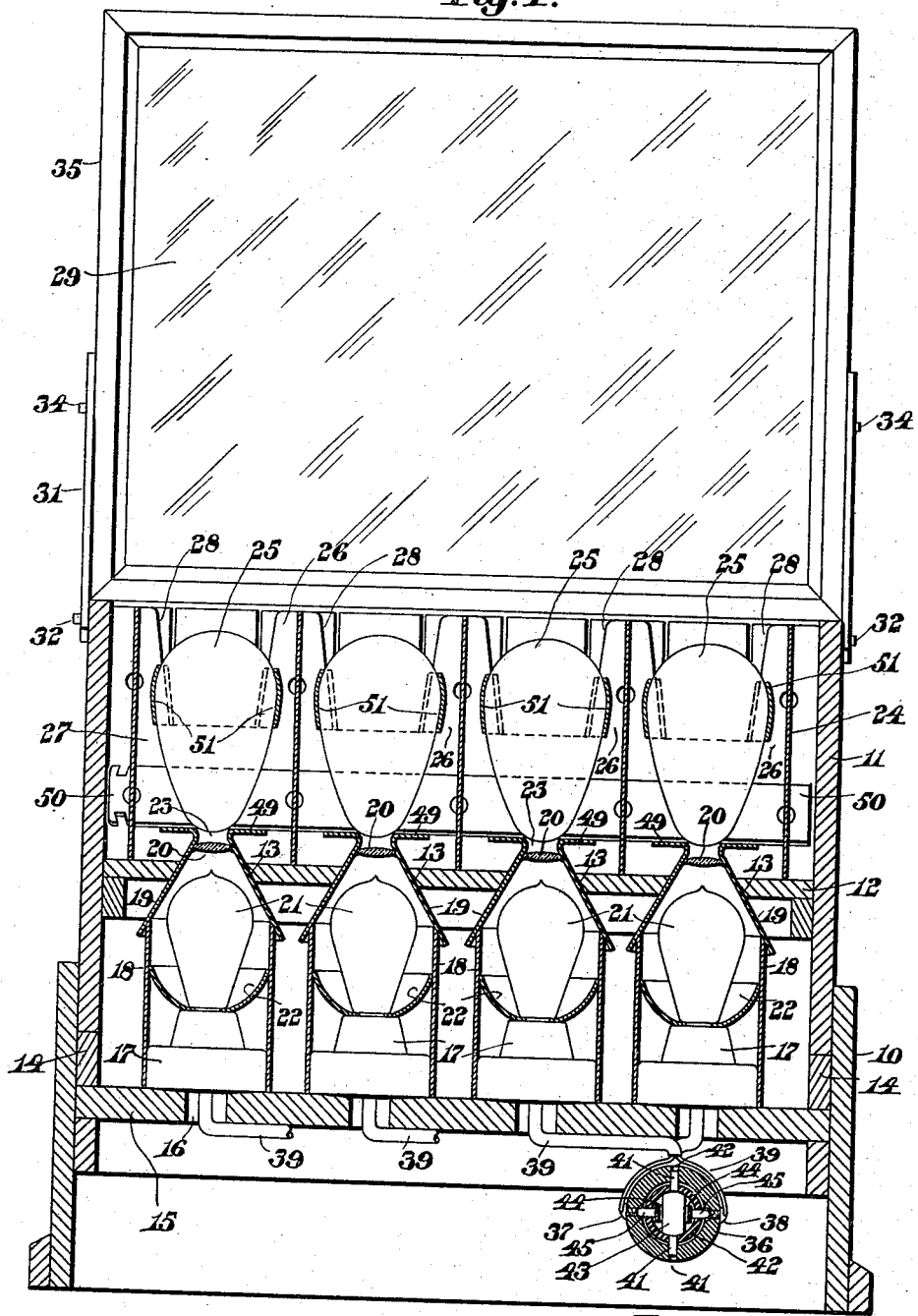
Figure 1 represents a vertical section of an apparatus embodying the principles of the present invention, the cutting plane being on line 1—1 on Fig. 2.

In the drawings 10 is a rectangular frame having superimposed thereon a casing 11 provided with a horizontal partition 12 having a plurality of openings 13 therethrough. The casing 11 is supported upon inwardly extending members 14 secured to the inner wall of the frame 10. The frame 10 is provided with a horizontal partition 15 having a plurality of openings 16 therethrough, the number of said openings 16 corresponding with the number of openings 13 which are in axial alinement with said openings 16.

Above each opening 16 is a socket 17 surrounded by a cylindrical wall 18, said wall 18 being provided with a cone-shaped hood 19 extending through each opening 13. Within each cone-shaped hood 19 is a lens 20, and beneath each lens 20 is an electric lamp 21 secured to the sockets 17. Each lamp 21 is surrounded by a reflector 22 interposed between the lamp 21 and the socket 17. These reflectors 22 are adapted to reflect the light from the lamps 21 upon the lenses 20 and thereby project the rays of light therefrom upwardly through the openings 23 in the upper ends of the hoods 19. The casing 11 is of such a shape as to receive an egg tray 24, in each of the pockets of which is centrally disposed an egg 25.

When the tray 24 has been placed within the casing 11 and supported upon the horizontal partition 12, the various eggs 25 in the pockets of said tray will be positioned immediately above the lenses 20 and the rays of light projected from the lamps 21 through these lenses 23 will illuminate the interior of these eggs 25 and effectually disclose the condition of the interior thereof.

The cross partitions 26 of the tray 24 have the upper portions thereof between the various pockets 27 cut away, as indicated at 28, so that the rear portions of the eggs 25 may be reflected in the mirror 29 hinged at the rear wall of the casing 11. This mirror may be adjusted to different angles with the upper surface of the tray 11 by means of the braces 31 pivoted to the tray 11 at 32 and having notches 33 either one of which is adapted to engage pins 34 projecting from the ends of the frame 35 of the mirror 29.

Extending across the frame 10 beneath the horizontal partition 15 is a tubular member 36 open at both ends. This tubular member 36 is constructed of some non-conducting material, and is provided with a plurality of pairs of contact members 37 and 38, each pair of contact members 37 and 38 being connected by wires 39 with one of the lamps 21. The contact members 37 and 38 extend partially through the tubular member 36 and said tubular member 36 is provided with a depression 38× at the inner end of each contact member 37 and 38.

Extending through the tubular member 36 is a long tubular member 40 which is provided with radial projecting members 41 movable along the oppositely disposed slots 42 in the tubular member 36, thereby preventing the rotation of said member 40 within said tubular member 36. Mounted in the slidable member 40 is a cross member 43 of some non-conducting material, said member having secured to opposite faces thereof resilient members 44, the free ends of which are provided with outwardly extending projections 45 which are adapted to move into the depressions 38× and make electric contact with each pair of contact members 37 and 38.

The opposite ends of the resilient members 44 are connected by wires 46 to a screw plug 47 adapted to be inserted in any suitable electric light socket. When the plug 47 has been inserted into an electric light socket, the electricity therefrom will pass to the resilient members 44 and projecting members 45, and through these projecting members 45 to the contacts 37 and 38, and then through the various circuits 39 to the electric lamps 21.

After the slidable member 40 is normally positioned with the projecting members 45 at the extreme rear end of the tubular member 36, that is, at the right hand end, as shown in Fig. 3 of the drawings, and said slidable member is then pulled toward the operator, electric contact is made with the various pairs of members 37 and 38, and each lamp 21 is successively illuminated and extinguished.

Preferably the wiring of the lamps is so arranged that the rear row of lamps will first be successively lit and as the end of that row is reached, the next row will be illuminated starting from the opposite end, and so on until all of the lamps have been successively lit.

When it is desired to candle a case of eggs, the operator takes from the case a tray containing eggs, and without handling the eggs or removing them from the tray, said tray is placed in position within the casing 11, and the handle 48 of the slidable member 36 is seized and moved in the direction of the arrow a on Fig. 2 of the drawings.

When the first lamp 21 is lit the rays of light therefrom will be projected into the interior of the egg located above said lamp, and the operator will first look at the front of the egg and observe the condition of its interior. Immediately raising his eyes to the reflection of the egg in the mirror 29, he observes the condition of the interior of the egg as reflected in said mirror from the rear side of said egg. If the egg appears to be in good condition the slidable member 36 is moved into position to light the next lamp and the same operation is repeated.

Whenever a bad egg is discovered a cross is made upon the egg, and the candling operation is continued. The tray is then removed with all of the eggs therein and a new tray is placed within the casing 11 and the operation repeated. The eggs which have been condemned by the tester and have received his mark are subsequently removed and replaced by eggs found to be in good condition.

The trays preferably used are trays similar to that shown and described in Letters Patent No. 1,097,743, issued to me May 26, 1914, although the best form of tray to be used in connection with this device would be the form of tray shown in another application of mine of even date herewith.

The upper ends of the hoods 19 are provided with outwardly extending flanges 49 on which the lower strips 50 of the tray are adapted to rest. It is obvious that when inserting the tray 24 in the casing 11, the upper strips 51 should extend away from the observer toward the mirror 29, thereby making it possible for the observer to see a larger surface of the egg.

The tubular member 36 is made in two parts separated by small pieces 52 of fiber or other nonconducting material, these members separating the two halves and forming the two longitudinal slots 42 before referred to. The two halves are held together by means of the rings 53 and 54 at the opposite ends of said tubular member 36.

This makes a very effective arrangement for candling eggs, as the whole operation may be performed without contact with the eggs or necessitating the removal of these eggs from the tray. It is obvious that by candling the eggs while in the tray by means of such an apparatus as is herein shown and described there will be a great saving in time and labor.

It is believed that the many advantages of this invention will be fully understood from the foregoing description.

Having thus described my invention, I claim:

1. In an egg tester, a receptacle; a plurality of lamps therein; an opaque casing for each lamp provided with a small opening; a lens in said opening; means for positioning a plurality of eggs above said lenses; and means for successively lighting said lamps.

2. In an egg tester, a receptacle; a plurality of lamps therein; an opaque casing for each lamp provided with a small opening; a lens in said opening; means for positioning a plurality of eggs above said lenses; and a movable member adapted in its movement to successively light said lamps.

3. In an egg tester, a receptacle; a plurality of lamps therein; an opaque casing inclosing each lamp and provided at its top with a small opening; a lens in said opening; means for concentrating the rays of each lamp on a lens; a tubular member extending through said receptacle; a plurality of pairs of contacts in said tube, each pair being electrically connected to the poles of a lamp; a member movable through said tube and provided with a pair of spring members adapted to engage each pair of contacts; and means for supplying an electric current to said spring members.

4. In an egg tester, a receptacle; a plurality of lamps therein; an opaque casing inclosing each lamp and provided at its top with a small opening; a lens in said opening; means for concentrating the rays of each lamp on a lens; a tubular member extending through said receptacle; a plurality of pairs of contacts in said tube, each pair being electrically connected to the poles of a lamp; a member movable through said tube and provided with a pair of spring members adapted to engage each pair of contacts; means for supplying an electric current to said spring members; and means for preventing said movable member from rotating relatively to said tubular member.

5. In an egg tester, a plurality of lamps; means for positioning an egg above each lamp; and means for successively lighting said lamps and illuminating the interior of said eggs.

6. In an egg tester, a plurality of lamps; means for positioning an egg above each lamp; means for successively lighting said lamps and illuminating the interior of said eggs; and means for reflecting the rear side of said eggs.

7. In an egg tester, a tray adapted to contain a plurality of eggs; means for successively illuminating the interiors of said eggs; and means for reflecting the rear side of said eggs.

8. In an egg tester, a tray adapted to contain a plurality of eggs; a casing to receive said tray; means for successively illuminating the interior of said eggs; and a mirror hinged to said casing and adapted to reflect the eggs in said tray.

9. In an egg tester, a tray adapted to contain a plurality of eggs; a casing to receive said tray; means for successively illuminating the interior of said eggs; a mirror hinged to said casing and adapted to reflect the eggs in said tray; and means whereby the angle of said mirror to the top of said casing may be varied.

10. In an egg tester, a tray adapted to contain a plurality of eggs; a casing to receive said tray; an electric lamp beneath each egg; an electric circuit for each lamp; means for attaching an electric conductor to a source of electric energy; and means for successively transferring the current from said conductor to each lamp circuit.

11. In an egg tester, a tray adapted to contain a plurality of eggs; a casing to receive said tray; an electric lamp beneath each egg; an electric circuit for each lamp; means for attaching an electric conductor to a source of electric energy; a tubular member provided with a plurality of pairs of contact members, each pair being connected to a lamp circuit; and a movable member within said tubular member carrying the free end of said conductor and adapted in its movement to successively make an electric connection between said contact members and said conductor.

12. In an egg tester, a tray adapted to contain a plurality of eggs; a casing to receive said tray; an electric lamp beneath each egg; an electric circuit for each lamp; means for attaching an electric conductor to a source of electric energy; a tubular member provided with a plurality of pairs of contact members, each pair being connected to a lamp circuit; a movable member within said tubular member carrying the free end of said conductor; resilient members carried by said movable member and electrically connected to said conductor adapted in their movement to successively make an electric connection with said contact members.

Signed by me at 4 Post Office Sq., Boston, Mass., this 22nd day of May, 1916.

JOHN B. WARREN.

Witnesses:
 WALTER E. LOMBARD,
 EDWARD F. ALLEN.

Copies of this patent may be obtained for five cents each, by addressing the "Commissioner of Patents, Washington, D. C."